US010365957B2

(12) United States Patent
Dupont et al.

(10) Patent No.: US 10,365,957 B2
(45) Date of Patent: *Jul. 30, 2019

(54) MULTICASTING OF EVENT NOTIFICATIONS USING EXTENDED SOCKET FOR INTER-PROCESS COMMUNICATION

(71) Applicant: Accedian Networks Inc., Saint-Laurent (CA)

(72) Inventors: Andre Dupont, St-Laurent (CA); Thierry DeCorte, Laval (CA); Frederick Lafleche, Montreal (CA)

(73) Assignee: Accedian Networks Inc., St-Laurent, Quebec (CA)

( * ) Notice: Subject to any disclaimer, the term of this patent is extended or adjusted under 35 U.S.C. 154(b) by 132 days.

This patent is subject to a terminal disclaimer.

(21) Appl. No.: 15/347,893

(22) Filed: Nov. 10, 2016

(65) Prior Publication Data

US 2017/0097858 A1    Apr. 6, 2017

Related U.S. Application Data

(63) Continuation of application No. 13/605,548, filed on Sep. 6, 2012, now Pat. No. 9,524,197.

(51) Int. Cl.
*G06F 9/46* (2006.01)
*G06F 9/54* (2006.01)

(52) U.S. Cl.
CPC .............. *G06F 9/542* (2013.01); *G06F 9/46* (2013.01); *G06F 9/541* (2013.01); *G06F 9/545* (2013.01); *G06F 2209/543* (2013.01)

(58) Field of Classification Search
CPC ...... G06F 2209/543; G06F 9/545; G06F 9/46; G06F 9/541; G06F 9/542
See application file for complete search history.

(56) References Cited

U.S. PATENT DOCUMENTS

| 6,367,037 | B1 | 4/2002 | Remer |
| 7,561,521 | B2 | 7/2009 | Meier |
| 7,996,631 | B1 | 8/2011 | Bender |

(Continued)

OTHER PUBLICATIONS

Building Compilable Class Models, David S. Frankel, 2001 (28 pages).

(Continued)

*Primary Examiner* — Charles E Anya
(74) *Attorney, Agent, or Firm* — Stratford Managers Corporation

(57) ABSTRACT

A system is provided for multicasting an event notification from an event producer to multiple event listeners, where the event producer and event listeners exist within a computer operating system having a user space, a kernel space, a device space, and an event protocol handler located in the kernel space. The system generates an event indication from an event producer located in the user space, kernel space, or device space, and receiving the event indication in the event protocol handler and generating an event notification. The event producer and the event listeners interface with the event protocol handler to send the event indication and receive the event notification. The event listeners may be located in the user space, kernel space, or device space.

17 Claims, 4 Drawing Sheets

(56) References Cited

U.S. PATENT DOCUMENTS

| | | |
|---|---|---|
| 2006/0294527 A1 | 12/2006 | Hardin |
| 2007/0266392 A1 | 11/2007 | Thoelke |
| 2008/0141274 A1 | 6/2008 | Bhogal |
| 2008/0270651 A1 | 10/2008 | Kreiner |
| 2009/0077572 A1 | 3/2009 | Andjelic |
| 2009/0178060 A1 | 7/2009 | Winter |
| 2009/0327994 A1 | 12/2009 | Christensen |
| 2010/0023626 A1 | 1/2010 | Hussain |
| 2010/0287140 A1 | 11/2010 | Oza |
| 2013/0031268 A1 | 1/2013 | Pope |
| 2013/0055287 A1 | 2/2013 | Pope |
| 2013/0191434 A1 | 7/2013 | Smith |
| 2013/0290508 A1* | 10/2013 | Besehanic ........ H04N 21/44204 709/224 |

OTHER PUBLICATIONS

Sosnoski, D. "Classworking toolkit: Combining source and bytecode generation", developerWorks, http://www.ibm.com/developerworks/java/library/j-cwt10045/index.html, Oct. 4, 2005 (9 pages).
Linux 2 6 22—Linux Kernel Newbies: http://kernelnewbies.org/Linux_2_6_22, Jul. 8, 2007 (15 pages).
Kernel Space—User Space Interfaces, Ariane Keller: http://people.ee.ethz.ch/~arkeller/linux/kernel_user_space_howto.html#s3, Jul. 2008 (21 pages).

\* cited by examiner

| User Function | Kernel Function | FPGA Socket API | Description |
|---|---|---|---|
| User_socket() | Kernel_create () | Fpga_prot_init () | Socket creation. |
| User_close() | Kernel_release () | Fpga_prot_close () | Close a socket. |
| User_connect() | Kernel_connect () | Fpga_prot_connect () | Connect a socket to the end point. |
| User_shutdown() | Kernel_shutdown () | Fpga_prot_disconnect () | Disconnect a socket end point. |
| User_sendmsg() | Kernel_sendmsg () | Fpga_prot_sendmsg () | Send a message to the end point. |
| User_recvmsg() | Kernel_recvmsg () | Fpga_prot_recvmsg () | Receive a message from the end point. |
| User_poll() | Using Callback Function / No polling | N/A | Select()/Poll() implementation. |

FIG. 2

| Function | Description |
| --- | --- |
| *Events_prot_init* () | Enables access to the Event Notification service |
| *Events_prot_connect* () | Used to specify the event notification groups to join |
| *Events_prot_disconnect* () | Used to remove an entity from the event notification groups |
| *Events_prot_sendmsg* () | Used to generate an event notification to the members of the event group that includes this notification |
| *Events_prot_recvmsg* () | Checks for a received notification. This is non blocking, and may return NULL or an ERROR condition |
| *Events_prot_close* () | This disables access to the Event Notification service |

FIG. 4

MULTICASTING OF EVENT NOTIFICATIONS USING EXTENDED SOCKET FOR INTER-PROCESS COMMUNICATION

CROSS REFERENCE TO RELATED APPLICATIONS

This application is a continuation of and claims priority to U.S. patent application Ser. No. 13/605,548, filed Sep. 6, 2012, now allowed, which is hereby incorporated by reference herein in its entirety.

FIELD OF THE INVENTION

The present invention relates to Inter-Process Communication between user space Applications and Operating System kernel modules, Device Drivers and Applications.

BACKGROUND OF THE INVENTION

In computer science, a thread of execution is the smallest unit of processing that can be scheduled by an operating system. In most cases, a thread is contained inside a process. Inter-process communication (IPC) is a set of methods for the exchange of data among multiple threads in one or more processes.

Conventional operating systems can be divided into two layers, user space and kernel space. Application code resides in user space, while the underlying facilities of the operating system reside in the kernel space. An IOCTL (input/output control) is a single system call by which user space may communicate with device drivers. The kernel can then allow the user space to access a device driver without knowing anything about the facilities supported by the device, and without needing a large collection of system calls.

When a computer program needs to connect to a local or wide area network such as the Internet, it uses a software component called a socket. The socket opens the network connection for the program, allowing data to be read and written over the network. The sockets allow the programs to use the operating system's built-in commands and protocol stacks to handle networking functions. IPC flows use sockets.

Netlink is an existing full-duplex communication link between the Linux Operating System's user space and Kernel. It makes use of the standard socket APIs for userspace processes, and a special kernel API for kernel modules. Netlink sockets provide the possibility of multicast inside the kernel. Netlink sockets provide a bidirectional communication channel; a message transfer can be initiated by either the kernel or the user space application. They have less overhead (header and processing) compared to standard UDP sockets.

In order to meet the performance requirements of protocols operating at high speeds (such as Ethernet at 10 Gbps or 100 Gbps) it is necessary to rethink how popular Inter-Process Communication (IPC) techniques can be used and implemented more efficiently while preserving the native services of an Operating System (such as, but not limited to, Linux) and more specifically the delineation of functions and rights for processes operating in the user space or application level and kernel level. Whenever an application reads or writes data to a socket, it's using a system call. This call (such as read or write) crosses the boundary of the user space application to the kernel. Additionally, prior to getting to the kernel, the call goes through the C library to a common function in the kernel (system_call( )). From system_call( ) this call gets to the filesystem layer, where the kernel determines what type of device it's dealing with.

Even with some of the most recent enhancements to OS's such as Linux, the context switching overhead is still too high, especially when building cost sensitive platforms using lower cost CPUs and other programmable devices. As such, the embodiment shows that it can deliver the required performance improvements (and overhead reduction) without the need to modify the underlying hardware platform.

For instance, the embodiment is used to handle recently developed protocols (such as Y.1731) that require the ability to process Service OAM messages at exactly every 3.33 msec (which is a much higher rate than what is permissible with a typical OS: usually in the range of 10-20 msec).

SUMMARY

In accordance with one embodiment, a system is provided for multicasting an event notification from an event producer to multiple event listeners, where the event producer and event listeners exist within a computer operating system having a user space, a kernel space, a device space, and an event protocol handler located in the kernel space. The system generates an event indication from an event producer located in the user space, kernel space, or device space, and receiving the event indication in the event protocol handler and generating an event notification. The event producer and the event listeners interface with the event protocol handler to send the event indication and receive the event notification. The event listeners may be located in the user space, kernel space, or device space.

In one implementation, each event indication belongs to a single group of events, and the event listeners register with the event protocol handler to receive event notifications for one or more groups of events in which the event listeners are interested. The event protocol handler may generate an event notification based on the event indication and multicasts the event notification to all event listeners that have registered to receive notifications for the group of events to which the event indication is assigned. The event protocol handler may use socket buffers to multicast the event notification to event listeners in the user space.

The interfacing with the event protocol handler may be achieved via an event management application programming interface containing primitives including opening and closing a kernel socket interface, registering or deregistering an event listener for one or more event groups, generating an event indication, receiving an event notification via a callback function in the kernel space, and receiving an event indication after being notified of an available event notification.

BRIEF DESCRIPTION OF THE DRAWINGS

The invention may best be understood by reference to the following description taken in conjunction with the accompanying drawings.

FIG. 2 provides a summary of the IPC API primitives available in the user space and their corresponding primitives when used from the kernel space or the device space.

FIG. 4 shows the event management API.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Typical IPC services of the operating system available to applications in the user space are extended to the kernel space to reduce the overhead when an application needs to interface with services offered by the kernel. These enhanced socket-based services also extend beyond the kernel to programmable devices (such as, but not limited to FPGA) in the device space that do not operate under the same operating system.

Because of the sensitivity of the services performed in the kernel space and by programmable devices in the device space not running the same operating system, it is imperative that while the native semantics of popular IPC mechanisms is preserved, that it never results into a blocked (or sleeping) event while operating in kernel mode or inside a programmable device in the device space.

Figure 1:
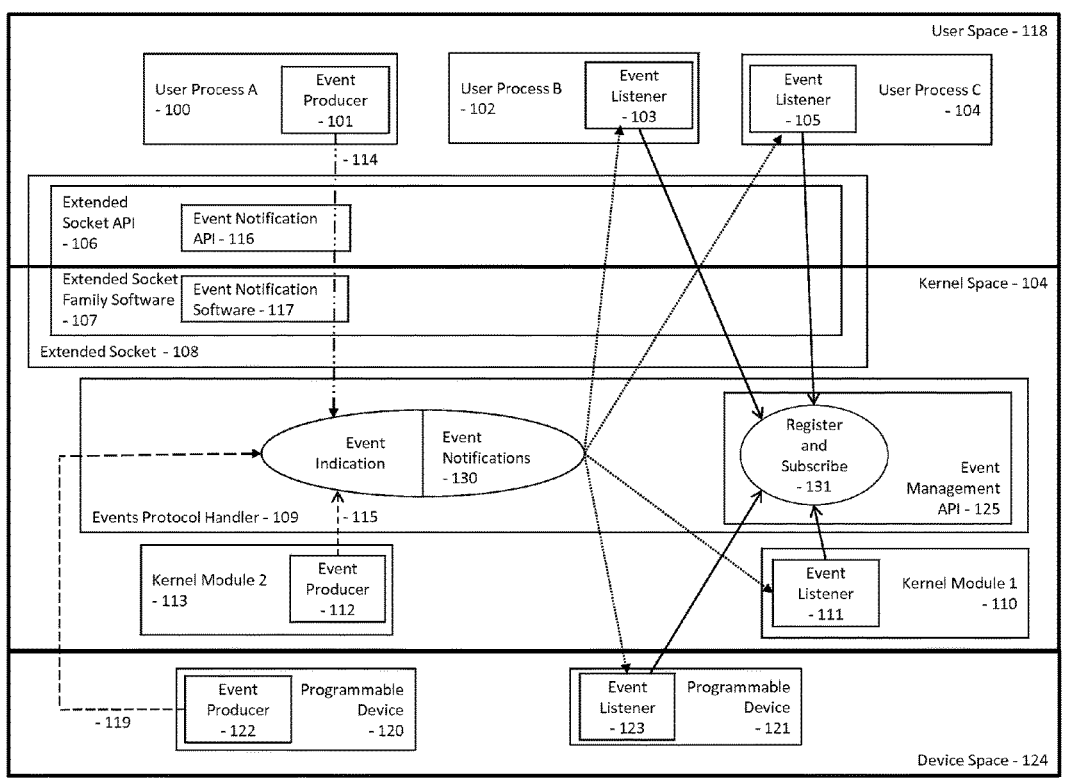
FIG. 1 shows the division between user space and kernel space and programmable devices in the device space, the events protocol handler, the extended socket and the events going between them.

Referring to FIG. 1, a new extended socket 108 is defined to allow the use of sockets for non-blocking communication between user process 100 in user space 118 and other user processes (102, 104), kernel modules (113, 110) and programmable devices (120, 121). This includes an extended socket API 106 in user space 118 and extended socket family software 107 in kernel space 104. An event notification API 116 is added to the extended socket API 106 and event notification software 117 is added to the extended socket family software 107 in the kernel space 104.

When an event indication (114, 115, 119) from an event producer (101, 112, 122) is received by the event protocol handler 109, the event protocol handler 109 is responsible for multicasting the resulting event notifications 130 to a plurality of event listeners (103, 105, 111, 123) using socket buffers when the recipient of the event notification is located in the user space 118 or the kernel space 104 and using device specific techniques such as hardware registers, memory interfaces and/or input/output (i/o) pins or signals when the recipient is in the device space 124. A kernel module 110 or a programmable device 121 shall never block while waiting for an event notification 130. Therefore, rather than wait for an event notification 130, a callback routine is registered by each thread in kernel module 110 or programmable device 121 (via a device driver in the kernel space 104) interested in one or more events by doing a register and subscribe 131 via the event management API 125 and a callback routine will be called whenever an event notification 130 is generated. Since the kernel callback function potentially operates in the context of an interrupt service routine, the event should be handled as quickly as possible as per the typical OS guidelines.

An event indication (114, 115, 119) can be multicast as event notifications 130 to one or more event listeners (103, 105, 111, 123) part of the user process (102, 104) or kernel module 110 or programmable device 121 doing a register and subscribe 131 for one or more event groups via the event management API 125. Whenever an event indication 114 is sent from the user space 118, the extended socket API 106 is used. Otherwise, event indications (115, 119) originating from the kernel space 104 or the device space 124 are handled directly by the events protocol handler 109 in the kernel space 104.

The extended socket API 106 can be used from the user space 118 to interface to the events protocol handler 109, while module 110 in the kernel space 104 and programmable device 121 such as FPGAs in the device space 124 interface to the events protocol handler 109 via the event management API 125. It should be noted that programmable devices (120, 121) in the device space 124 do not operate inside the operating system.

More specifically, and unlike the Netlink Socket interface, the embodiment adds support for event indications (114, 115, 119), including the ability to multicast event notifications 130 between any combinations of modules, threads or applications:

user space 118 to user space 118, kernel space 104 and device space 124.
 kernel space 104 to kernel space 104, user space 118, and device space 124.
 device space 124 to kernel space 104, user space 118, and other device space 124.

As can be exemplified from FIG. 1, an event indication 119 originating from a programmable device 120 is sent via registering with the event management API 125 to the events protocol handler 109. The resulting event notifications 130 are then multicast to kernel module 110, programmable device 121 and user process 102 and 104 registered for the corresponding event notification 130. The event notifications 130 are asynchronous to avoid potential deadlock or blocked processes/threads.

FIG. 2 summarizes the primitives making up the extended socket API 106 as they are used from the user space 118, the kernel space 104 and from the device space 124.

Figure 3:
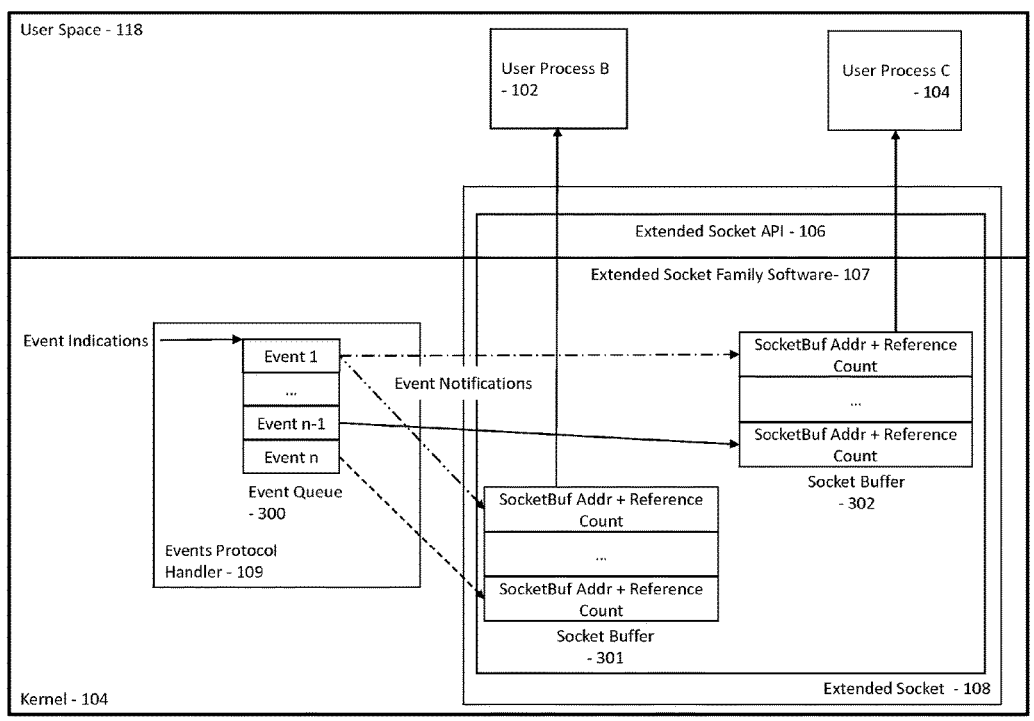
FIG. 3 shows the queuing of events and how they are distributed through the socket interface.

FIG. 3 illustrates how events 1-n in the event queue 300 found in the events protocol handler 109 are mapped to socket buffers (301, 302) under the extended socket 108 in order to allow for the notification of any number of user processes (102, 104) in the user space 118 (or in the kernel modules 110 in the kernel space in a similar way).

FIG. 4 summarizes the event management API 125.

The event protocol handler 109 offers an event management API 125 to provide non-blocking delivery of event indications (114, 115, 119) originating from user processes 100, kernel modules 110 and from programmable device 121 as event notifications 130. This is critical to allow event notifications to be generated toward kernel module 110 threads, programmable device 121 and user space processes (102, 104) whether the execution context is inside a kernel thread that can be blocked (or sleep) or whether the event indication is generated from inside an IRQ or SOFT IRQ routine that simply cannot be blocked and needs to complete its processing as fast as possible.

This invention augments the real-time capabilities of any OS that support the notion of user space 118 and kernel space 104 and the memory protection (as well as other system resources) whereby a user process (100, 102, 104) in the user space 118 cannot freely access resources (memory, file handlers, etc.) allocated to another user process (100, 102, 104). This level of protection requires relatively expensive context swapping when the OS schedules another user process (100, 102, 104) or when an user process (100, 102, 104) communicates with kernel modules (110, 113). By reducing the overhead required to communicate between processes (originating from the user space 118 and/or kernel space 104 and/or device space 124), it becomes easier to support various real-time constraints, including but not limited to data communication platforms or applications (for instance financial trading, cloud computing, etc.)

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system for multicasting an event notification from an event producer to multiple event listeners, the system comprising:
    a computer execute an operating system, said operating system comprising said event producer and said multiple event listeners, said computer operating system comprising a user space, a kernel space comprising an event protocol handler, and a device space;
    an extended socket allow non-blocking communication between said user space, kernel space and said device space;
    an extended socket application programming interface (API) execute in said user space, wherein said extended socket application programming interface (API) includes an event notification application programming interface (API);
    an extended socket family software execute in said kernel space, wherein said extended socket family software includes an event notification software, and wherein said extended socket application programming interface (API) and said extended socket family software execute in said extended socket;
    said event producer generate an event indication;
    said event protocol handler receive said event indication and generate an event notification;
    said event producer and said multiple event listeners interfacing with said event protocol handler to send said event indication and receive said event notification, wherein if said event indication is from said user space use said extended socket application programming interface (API) to send said event indication and receive said event notification, otherwise, send said event indication and receive said event notification directly through said event protocol handler; and
    wherein if said event producer is located in said kernel space, at least one of said multiple even listeners are located in either said kernel space or said device space.

2. The system of claim 1 wherein each event indication belongs to a single group of events.

3. The system of claim 1 wherein said multiple event listeners are adapted to register with said event protocol handler to receive event notifications for one or more groups of events in which said multiple event listeners are interested.

4. The system of claim 3 wherein said event protocol handler is adapted to generate an event notification based on said event indication and to multicast said event notification to all of said multiple event listeners that have registered to receive notifications for the group of events to which said event indication is assigned.

5. The system of claim 1 wherein said event protocol handler is adapted to use socket buffers to multicast said event notification to said multiple event listeners in said user space.

6. The system of claim 1 wherein said event protocol handler is adapted to use socket buffers to multicast said event notification to said multiple event listeners in said kernel space.

7. The system of claim 1 wherein said event protocol handler is adapted to use device specific techniques to multicast said event notification to said multiple event listeners in said device space, said device specific techniques including at least one of: device registers; device memory; and input/output signals or pins.

8. The system of claim 1 further comprising an event management application programming interface for interfacing with said event protocol handler, said interface containing primitives including:
    opening and closing a kernel socket interface;
    registering or deregistering an event listener for one or more event groups;
    generating an event indication;
    receiving an event notification via a call-back function in the kernel space; and
    receiving an event indication after being notified of an available event notification.

9. A system for multicasting an event notification from an event producer to multiple event listeners, said event producer and multiple event listeners existing within a computer associated with computer-readable storage media and a computer operating system comprising a user space, a kernel space comprising an event protocol handler, and a device space, said system comprising:
    said computer executing said computer operating system, said operating system comprising:
        an extended socket allow non-blocking communication between said user space, kernel space and said device space;
        an extended socket application programming interface (API) located in said user space comprising an event notification application programming interface (API);
        extended socket family software located in said kernel space comprising event notification software, wherein said extended socket application programming interface (API) and said extended socket family software execute in said extended socket;
        said event producer for generating an event indication located in said kernel space, wherein each event indication is assigned to a single group of events;
        said multiple event listeners located in said kernel space and said device space and registered with said event protocol handler to receive event notifications for one or more groups of events in which said multiple event listeners are interested;
        said event protocol handler receiving said generated event indication when said event indication is sent from either said kernel space or said device space and generating an event notification using at least one of said event notification application programming interface (API) and said event notification software, wherein said generating of event notification is based on said event indication; and
        said event producer and said multiple event listeners interfacing with said event protocol handler to send said event indication when said event indication is sent from either said kernel space or said device space and receive said event notification, wherein said event protocol handler multicasts said generated event notification to all event listeners that have registered to receive notifications for the group of events to which said event indication is assigned, and wherein if said event indication is from said user space use said extended socket application programming interface (API) to send said event indication and receive said event notification, otherwise, send said event indication and receive said event notification directly through said event protocol handler; and wherein if said event producer is located in said kernel space, at least one of said multiple even listeners are located in either said kernel space or said device space.

10. The system of claim 9 wherein said event protocol handler uses socket buffers to multicast said event notification to multiple event listeners in said user space.

11. The system of claim 9 wherein said event protocol handler uses socket buffers to multicast said event notification to multiple event listeners in said kernel space.

12. The system of claim 9 wherein said event producer and said multiple event listeners interface with said event protocol handler via an event management application programming interface, said programming interface containing primitives including:

opening and closing a kernel socket interface;

registering or deregistering an event listener for one or more event groups; generating an event indication;

receiving an event notification via a call-back function in the kernel space; and receiving an event indication after being notified of an available event notification.

13. The system of claim 9 wherein if said event producer is located in said kernel space, one or more of said multiple event listeners are located in either the kernel space or the device space.

14. The system of claim 9 wherein said event protocol handler uses device specific techniques to multicast said event notification to said multiple event listeners in said device space, said device specific techniques including at least one of device registers, device memory, and input/output signals or pins.

15. The system of claim 9 wherein said extended socket application programming interface handles said event indication when said event indication originates from said user space.

16. A system for multicasting an event notification from an event producer to multiple event listeners, said event producer and said multiple event listeners existing within a computer associated with computer-readable storage media and a computer operating system having a user space and a device space, and an event protocol handler located in said kernel space, said computer comprising:

an extended socket allow non-blocking communication between said user space, kernel space and said device space;

an extended socket application programming interface (API) loaded in said user space;

extended socket family software loaded into said kernel space;

wherein an event notification application programming interface (API) is included in said extended socket application programming interface (API), wherein an event notification software is included in said extended socket family software, wherein said event notification application programming interface (API) and said event notification software for generating an event notification and wherein said extended socket application programming interface (API) and said extended socket family software execute in said extended socket;

at least one of said multiple listeners are located in said kernel space and said device space; and said event producer located in said kernel space for generating an event indication located in at least one of said user space and device space;

said event protocol handler receiving said generated event indication when said event indication is sent from said device space and generating an event notification, and said event producer and said multiple event listeners interfacing with said event protocol handler to send said event indication when said event indication is sent from said device space and receive said event notification, wherein said event producer and said multiple event listeners interface with said event protocol handler via an event management application programming interface and wherein if said event indication is from said user space use said extended socket application programming interface (API) to send said event indication and receive said event notification, otherwise, send said event indication and receive said event notification directly through said event protocol handler.

17. The system of claim 16, wherein said programming interface containing primitives including:

opening and closing a kernel socket interface;

registering or deregistering an event listener for one or more event groups, generating an event indication;

receiving an event notification via a call-back function in the kernel space; and receiving an event indication after being notified of an available event notification.

\* \* \* \* \*